(12) United States Patent
Rizkin et al.

(10) Patent No.: US 7,744,246 B2
(45) Date of Patent: Jun. 29, 2010

(54) PORTABLE LUMINAIRE

(75) Inventors: Alexander Rizkin, Redondo Beach, CA (US); Robert H. Tudhope, Rancho Palos Verdes, CA (US)

(73) Assignee: Farlight, LLC, Newport Beach, CA (US)

( * ) Notice: Subject to any disclaimer, the term of this patent is extended or adjusted under 35 U.S.C. 154(b) by 285 days.

(21) Appl. No.: 11/930,423

(22) Filed: Oct. 31, 2007

(65) Prior Publication Data

US 2008/0192467 A1 Aug. 14, 2008

Related U.S. Application Data

(63) Continuation of application No. 10/277,230, filed on Oct. 21, 2002, now Pat. No. 7,503,669, which is a continuation-in-part of application No. 09/566,521, filed on May 8, 2000, now Pat. No. 6,543,911.

(51) Int. Cl.
*F21V 7/00* (2006.01)
(52) U.S. Cl. .................. 362/245; 362/333; 362/334; 362/335; 362/246
(58) Field of Classification Search ................ 362/327, 362/333–335, 240, 244–246, 309; 359/718
See application file for complete search history.

(56) References Cited

U.S. PATENT DOCUMENTS

| | | | |
|---|---|---|---|
| 1,676,463 A | 7/1928 | Ryan | |
| 1,888,995 A | 11/1932 | Matter | |
| 2,215,900 A | 9/1940 | Bitner | |
| 2,589,569 A | 3/1952 | Peter et al. | |
| 3,402,981 A * | 9/1968 | Cardone | 359/613 |
| 3,610,912 A | 10/1971 | Schwartz | |
| 3,852,584 A | 12/1974 | Levin | |

(Continued)

FOREIGN PATENT DOCUMENTS

CN 87107021 4/1988

(Continued)

OTHER PUBLICATIONS

Office Action in U.S. Appl. No. 10/316,642 (USP 6,814,470), dated Feb. 20, 2004.

(Continued)

*Primary Examiner*—Anabel M Ton
(74) *Attorney, Agent, or Firm*—The Law Office of Clay McGurk; Clay McGurk

(57) ABSTRACT

A portable luminaire includes an optical module, a power source and a housing. The optical module has at least one light emitting diode (LED) that emits light with a wide divergence, a non-imaging optical element and a transparent window. The non-imaging optical element (NIO) has a refractive member located around a LED optical axis and a total internal reflection member located around the refractive member. The refractive member and the total internal reflection member are integrated in a single transparent element having a mutual focal point. The NIO element collects a significant amount of light emitted by the LED with wide divergence located at the focal point to compress the collected light with high efficiency into a required pattern with a generally different angular distribution in a horizontal plane and a vertical plane, and to direct the compressed light outside of the luminaire.

7 Claims, 6 Drawing Sheets

U.S. PATENT DOCUMENTS

| | | | |
|---|---|---|---|
| 3,875,561 A | 4/1975 | Scarpino et al. | |
| 4,337,759 A | 7/1982 | Popovich et al. | |
| 4,355,350 A | 10/1982 | Mader | |
| 4,382,274 A | 5/1983 | De Backer et al. | |
| 4,617,768 A | 10/1986 | Gebelius | |
| 4,678,269 A | 7/1987 | Pace | |
| 4,767,172 A | 8/1988 | Nichols et al. | |
| 4,768,133 A | 8/1988 | Simons et al. | |
| 4,826,273 A | 5/1989 | Tinder et al. | |
| 4,915,484 A | 4/1990 | Yamamoto | |
| 5,103,381 A | 4/1992 | Uke | |
| 5,105,347 A | 4/1992 | Ruud et al. | |
| 5,134,550 A | 7/1992 | Young | |
| 5,136,483 A | 8/1992 | Schoniger et al. | |
| 5,161,874 A | 11/1992 | Benes | |
| 5,180,221 A | 1/1993 | Yoder | |
| 5,289,356 A | 2/1994 | Winston | |
| 5,321,717 A | 6/1994 | Adachi et al. | |
| 5,363,469 A | 11/1994 | Elderfield | |
| 5,408,395 A | 4/1995 | Schmid et al. | |
| 5,467,335 A | 11/1995 | Braat | |
| 5,469,347 A | 11/1995 | Duve et al. | |
| 5,471,371 A | 11/1995 | Koppolu et al. | |
| 5,553,174 A | 9/1996 | Snyder | |
| 5,556,189 A | 9/1996 | Wallis | |
| 5,575,550 A | 11/1996 | Appeldorn et al. | |
| 5,592,578 A | 1/1997 | Ruh | |
| 5,621,829 A | 4/1997 | Ford | |
| 5,629,996 A | 5/1997 | Rizkin et al. | |
| 5,704,709 A | 1/1998 | Zwick et al. | |
| 5,707,130 A | 1/1998 | Zwick et al. | |
| 5,775,792 A | 7/1998 | Wiese | |
| 5,785,410 A | 7/1998 | Branson, Sr. | |
| 5,800,050 A | 9/1998 | Leadford | |
| 5,813,743 A | 9/1998 | Naka | |
| 5,854,872 A | 12/1998 | Tai | |
| 5,926,320 A | 7/1999 | Parkyn, Jr. et al. | |
| 5,929,788 A | 7/1999 | Vukosic | |
| 5,951,144 A | 9/1999 | Gavigan et al. | |
| 6,013,985 A | 1/2000 | Green et al. | |
| 6,028,535 A | 2/2000 | Rizkin et al. | |
| 6,048,083 A | 4/2000 | McDermott | |
| 6,075,650 A | 6/2000 | Morris et al. | |
| 6,097,549 A | 8/2000 | Jenkins et al. | |
| 6,107,916 A | 8/2000 | Beck et al. | |
| 6,132,072 A | 10/2000 | Turnbull et al. | |
| 6,155,703 A | 12/2000 | Rizkin et al. | |
| 6,168,294 B1 | 1/2001 | Erni et al. | |
| 6,210,017 B1 | 4/2001 | Miura et al. | |
| 6,334,699 B1 | 1/2002 | Gladnick | |
| 6,380,864 B1 | 4/2002 | Richard | |
| 6,402,347 B1 | 6/2002 | Maas et al. | |
| 6,450,661 B1 | 9/2002 | Okumura | |
| 6,547,423 B2 | 4/2003 | Marshall et al. | |
| 6,565,239 B2 | 5/2003 | Rizkin et al. | |
| 6,568,827 B2 | 5/2003 | Forster | |
| 6,814,470 B2 * | 11/2004 | Rizkin et al. | 362/327 |
| 6,899,443 B2 * | 5/2005 | Rizkin et al. | 362/327 |
| 6,902,291 B2 * | 6/2005 | Rizkin et al. | 362/153.1 |
| 7,503,669 B2 * | 3/2009 | Rizkin et al. | 362/183 |
| 7,568,821 B2 | 8/2009 | Peck et al. | |
| 2002/0136027 A1 | 9/2002 | Hansler et al. | |
| 2003/0072150 A1 * | 4/2003 | Rizkin et al. | 362/183 |
| 2003/0137838 A1 * | 7/2003 | Rizkin et al. | 362/240 |
| 2003/0189832 A1 | 10/2003 | Rizkin et al. | |
| 2003/0193807 A1 | 10/2003 | Rizkin et al. | |
| 2006/0268549 A1 | 11/2006 | Oehlke | |

FOREIGN PATENT DOCUMENTS

| | | |
|---|---|---|
| DE | 2201574 A1 | 7/1973 |
| DE | 4128995 | 8/1991 |
| DE | 4129094 | 9/1991 |
| DE | 4305585 | 2/1993 |
| DE | 4243175 | 6/1994 |
| DE | 19507234 A1 | 2/1995 |
| DE | 19507234 | 9/1996 |
| DE | 29708858 | 5/1997 |
| DE | 19647094 | 6/1997 |
| DE | 19728354 | 1/1999 |
| DE | 19739173 C2 | 3/1999 |
| EP | 0635744 | 10/1993 |
| EP | 0766115 | 9/1996 |
| EP | 0780265 | 12/1996 |
| EP | 0798788 | 1/1997 |
| EP | 0798788 | 2/1997 |
| EP | 0762515 | 3/1997 |
| EP | 0942225 | 3/1999 |
| JP | 61147585 | 7/1986 |
| JP | 61147585 A | 7/1986 |
| JP | 63033879 | 2/1988 |
| JP | 1125719 | 5/1989 |
| WO | 9901695 A1 | 7/1997 |
| WO | 9909349 A1 | 8/1997 |
| WO | 0024062 | 4/2000 |
| WO | WO 0024062 | 4/2000 |

OTHER PUBLICATIONS

Notice of Allowability in U.S. Appl. No. 10/316,642 (USP 6,814,470), dated Aug. 10, 2004.
Examiner Interview in U.S. Appl. No. 10/316,642 (USP 6,814,470), dated Aug. 10, 2004.
Notice of Allowability in U.S. Appl. No. 10/620,524 (USP 6,902,291), dated Dec. 16, 2004.
Non-Final Office Action in U.S. Appl. No. 11/933,248, dated Feb. 4, 2010.
Notice of Allowability in U.S. Appl. No. 10/391,327 (USP 6,951,418), dated Mar. 22, 2005.
Office Action in U.S. Appl. No. 101391,327 (USP 6,951,418), dated Dec. 12, 2003.
Office Action in U.S. Appl. No. 10/391,327 (USP 6,951,418), dated Jun. 9, 2004.
Notice of Allowability in U.S. Appl. No. 10/408,923 (USP 6,899,443), dated Jan. 24, 2005.
Office Action in U.S. Appl. No. 101408,923 (USP 6,899,443), dated Jul. 13, 2004.
Communication from EPO related to European Patent Application No. 06016404.3, dated Nov. 30, 2009.
EPO Examination in 019357631, dated Apr. 29, 2005.
EPO Search Report in 019357631, dated Dec. 29, 2004.
International Search Report for PCT/US04/23037, dated Mar. 28, 2005.
International Search Report for PCT/US03/33227, dated Sep. 1, 2006.
International Search Report for PCT/US2008/081981, dated Feb. 2, 2009.

* cited by examiner

PORTABLE LUMINAIRE

CROSS-REFERENCE TO RELATED APPLICATION

This application is a continuation of and claims priority to U.S. patent application Ser. No. 10/277,230, filed Oct. 21, 2002 now U.S. Pat. No. 7,503,669; which is a continuation-in-part of U.S. patent application Ser. No. 09/566,521, filed May 8, 2000, now U.S. Pat. No. 6,543,911.

BACKGROUND OF THE INVENTION

1. Field of Invention

The present invention relates generally to luminaries for airfield lighting. In particular, the present invention relates to deployable elevated luminaries for portable airfield and heliport applications including omnidirectional runway edge lighting, threshold and stop bars, and unidirectional approach lights.

2. Discussion of Relevant Prior Art

The distinctive property of portable airfield lighting is the absence of power infrastructure on the site. There are currently two types of systems available for portable airfield lighting using conventional light sources. The first type of system includes a deployable version of airfield infrastructure having power generators, current regulators, cables, isolation transformers and luminaries. Unfortunately, this type of system is bulky, typically weighs in excess of 30,000 lbs, is packaged in six containers requiring 48 foot flatbed trailers for transportation, and requires a team of six people for installation that often takes over three hours.

The second type of portable airfield lighting system is based on the use of a rechargeable battery and a conventional filament bulb as a light source. Even though this type of system does not require the elaborate infrastructure associated with the first system, the luminaries are still heavy and bulky because they include two lead acid 12 v batteries. Additionally, the operation time on this second system without recharging is limited to 8-10 hours. Finally, high intensity approach lights cannot be operated from the battery but rather require the use of a generator.

What is needed, therefore, to overcome these limitations found in conventional systems is the application of solid-state technology (e.g., light emitting diodes) as a light source for portable airfield luminaries. Portable airfield luminaire using LEDs would utilitize low power consumption and the system would be significantly smaller and lightweight than conventional systems.

One of the requirements for airfield lighting systems including portable systems is related to the government (Federal Aviation Administration—FAA) and international (International Civil Aviation Organization—ICAO) specifications. These specifications identify light intensity in a variety of directions, color, dimensions and other design parameters. In particular, spatial light distribution in the horizontal plane varies from several degrees to omnidirectional (360°), while in the vertical plane it does not exceed 10° for the main beam.

The luminous intensity required for airfield lights varies from several candelas to in excess of 10,000 candelas, which makes implementing LEDs into portable airfield lighting systems extremely difficult. For example, in order to use LEDs in a system, the luminous flux generated by a single LED is still limited, thereby necessitating the combination of multiple LEDs. Additionally, the spatial light distribution emitted by the LED depends on the primary optics integrated into the LED package. Therefore, any previous attempts to integrate multiple LEDs into an airfield lighting system rely on a specific design of the primary optics. Unfortunately, practical implementation of a multiple LED system has not been realized because of this reliance on a specific primary optic design.

The majority of manufacturers have in production LED packages with the primary optic designed to provide a symmetrical pattern with low (6° to 15°), medium (15° to 45°) and wide (up to 120°) divergence because of the nature of the asymmetrical pattern emitted by the LED's die (chip). In general, a primary optic with low divergence has more losses (e.g., it is less efficient).

BRIEF SUMMARY OF THE INVENTION

The present invention provides a portable directional airfield luminaire based on the use of an LED as a light source in combination with a highly efficient non-imaging optical element (secondary optic) for a specific spatial distribution. Multiple LEDs can also be used in combination with the secondary optic for a wide horizontal angle distribution, wherein the vertical angle remains limited. The system can also include an omnidirectional luminaire. The present system further includes a controller and remote control for autonomous operation in standard three-level lighting intensity in steady or flash settings. A solar element for recharging of the power source can also be integrated into the present system.

According to one aspect of the invention a portable luminaire includes an optical module, a power source, a housing and installation hardware. The optical module includes a LED, a non-imaging optical element, and a transparent window. The at least one LED emits light with a wide divergence. The NIO element includes a refractive member located around a LED optical axis and a total internal reflection member located around the refractive member, wherein the refractive member and the total internal reflection member are integrated in a single transparent element having a mutual focal point, wherein the NIO element collects a significant amount of light emitted by the LED with wide divergence located at the focal point, to compress the collected light with high efficiency into a required pattern with a generally different angular distribution in a horizontal plane and a vertical plane, and to direct the compressed light outside of the luminaire. The transparent window transmits light outside of the luminaire. The autonomous rechargeable power source includes a connector to connect to an outside charger. The housing has a leveling mechanism and an aiming indicator. The installation hardware system is attachable to the housing.

According to yet another aspect of the invention, an optical module includes at least one light emitting diode (LED) that emits light with a wide divergence, a non-imaging optical element and a transparent window. The non-imaging optical element (NIO) includes a refractive member located around a LED optical axis and a total internal reflection member located around the refractive member, wherein the refractive member and the total internal reflection member are integrated in a single transparent element having a mutual focal point, wherein the NIO element collects a significant amount of light emitted by the LED with wide divergence located at the focal point, to compress the collected light with high efficiency into a required pattern with a generally different angular distribution in a horizontal plane and a vertical plane, and to direct the compressed light outside of a luminaire. The transparent window transmits light outside of the luminaire.

According to another aspect of the invention, a portable luminaire includes an optical module and a power source. The optical module includes multiple LEDs, a non-imaging optical element and a transparent window. The multiple LEDs emit light with a wide divergence. The NIO element includes a refractive member located around a LED optical axis and a total internal reflection member located around the refractive member, wherein the refractive member and the total internal reflection member are integrated in a single transparent element having a mutual focal point, wherein the NIO element collects a significant amount of light emitted by the LEDs with wide divergence located at the focal point, to compress the collected light with high efficiency into a required pattern with a generally different angular distribution in a horizontal plane and a vertical plane, and to direct the compressed light outside of the luminaire. The transparent window transmits light outside of the luminaire. The autonomous rechargeable power source includes a connector to connect to an outside charger These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

DETAILED DESCRIPTION OF THE PREFERRED EMBODIMENTS

Figure 1:
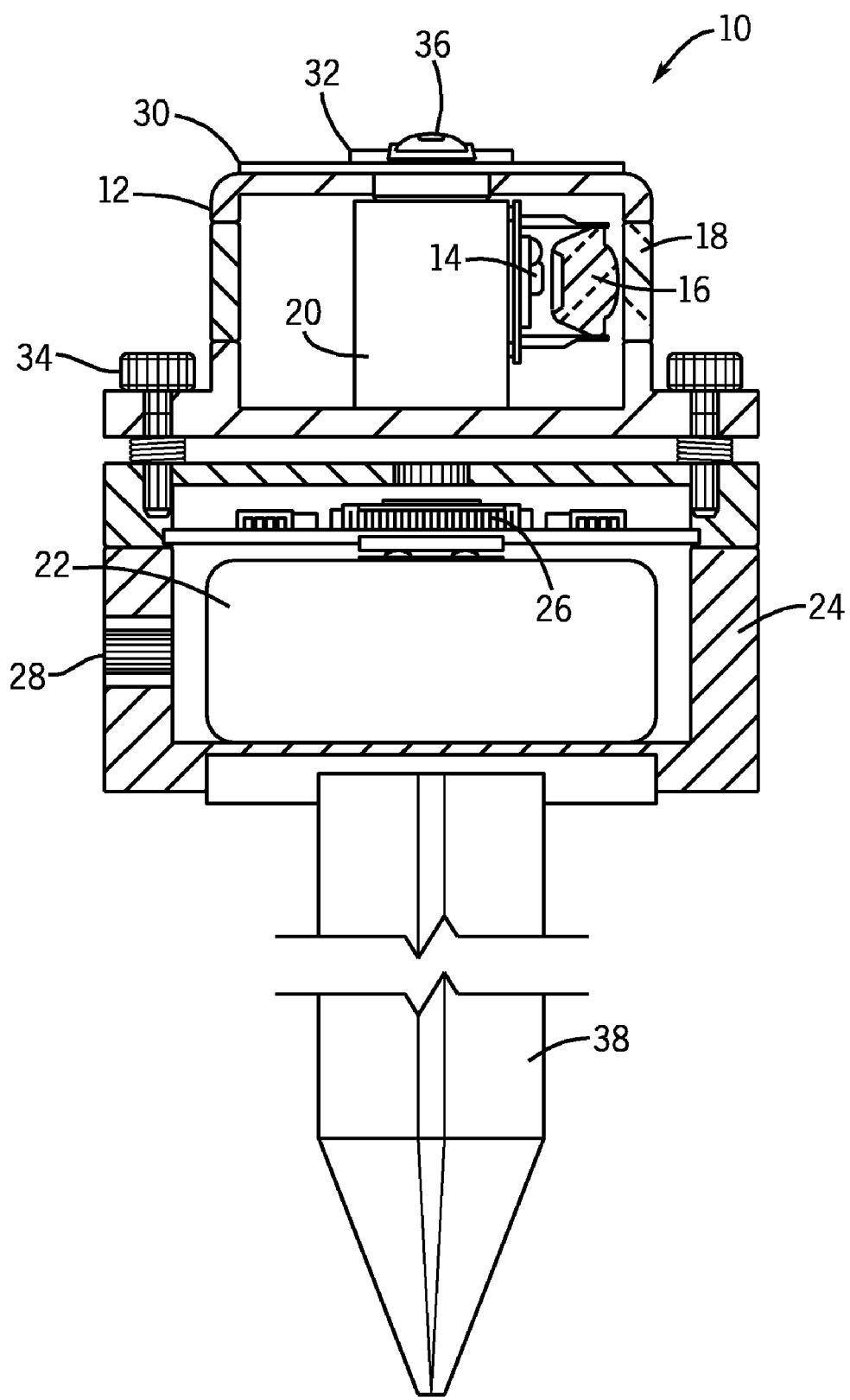
FIG. 1 is a cross-sectional view of a portable airfield luminaire according to the present invention.

Referring now to FIG. 1, a deployable airfield luminaire 10 includes an optical module 12 having a light emitting diode (LED) 14 for emitting light with a wide divergence, and a non-imaging optical element 16 to compress the emitted light into a desired pattern. Module 12 further includes a transparent window 18 to transmit compressed light outside luminaire 10.

A base 20 is a heat sink for LED 14 and a holder for non-imaging optical element 16. A rechargeable power source 22 is installed in a housing 24 and connected to LED 14 through a controller 26 to an outside charger (not shown) through a connector 28 and to a solar element 30 located on the top of optical module 12 (connection not shown).

Controller 26 includes conventional electronics to provide remote control operation through a sensor 32.

Housing 24 includes a leveling mechanism 34 that adjusts luminaire 10 with respect to the horizontal surface using an aiming indicator 36. An installation hardware system 38 is attached to the bottom of housing 24.

Figure 2:
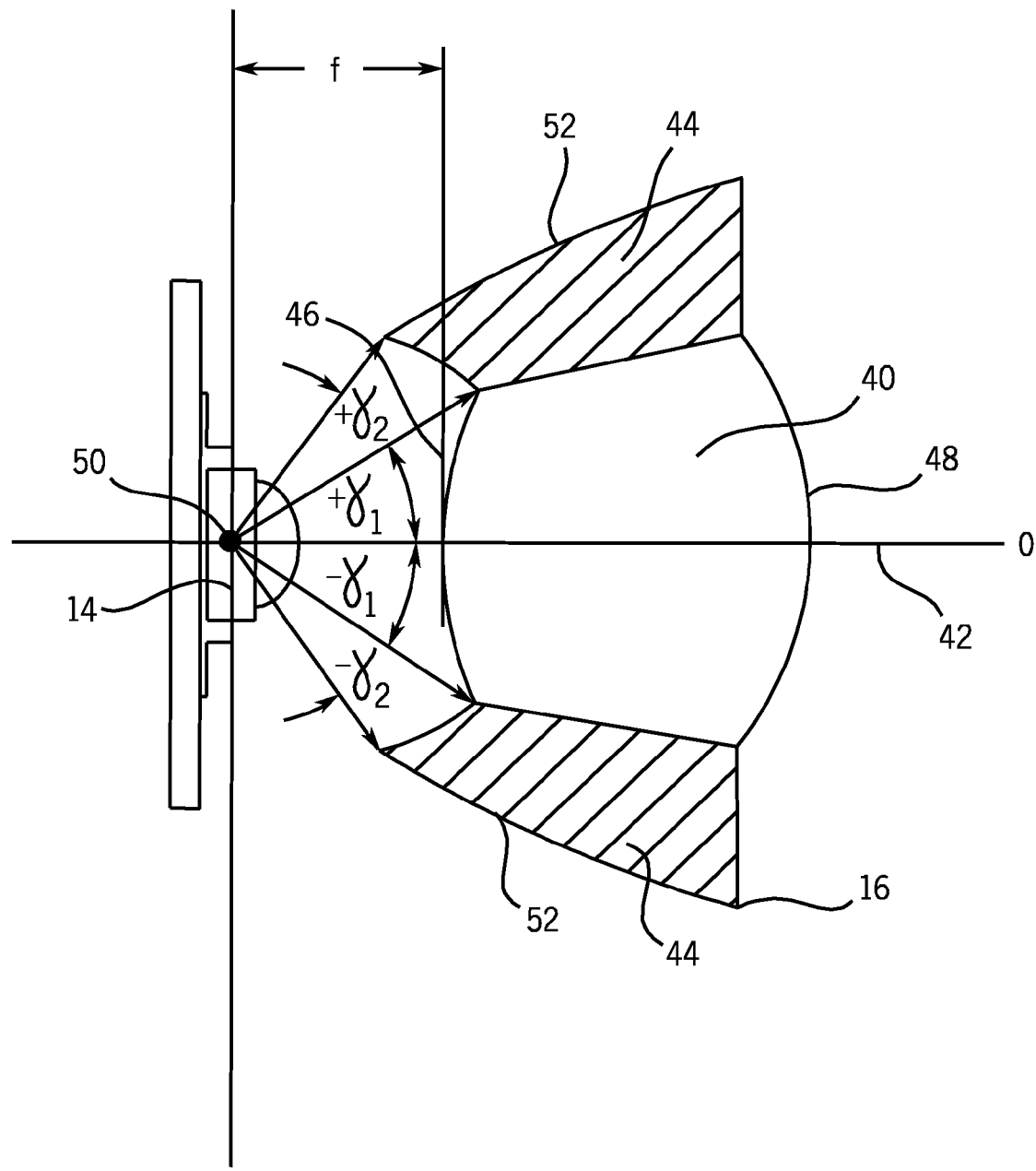
FIG. 2 is a cross-sectional view of a LED and non-imaging optic element according to the present invention.

Referring now to FIG. 2, non-imaging optical element 16 includes a combination of two functional parts: a refractive member 40 located symmetrically around an optical axis 42, and a total internal reflection (TIR) member 44 located symmetrically around refractive member 40. Both refractive member 40 and TIR member 44 are integrated in a single transparent seamless element having an input end 46 receiving light from LED 14 and an output end 48 directing light outside luminaire 10.

In the preferred embodiment of the present invention, refractive member 40 and TIR member 44 have a single mutual focal point 50 where LED's 14 lighting body (chip) is located. Focal point 50 is located on optical axis 42 at a focal distance f from the intersection of optical axis 42 with refractive member 40 input end 46.

LED 14 emits light with wide divergence (preferably up to 160°) that makes it difficult to collect emitted light with high efficiency by way of conventional optics. In the preferred embodiment of the present invention, non-imaging optical element 16 collects light via two mechanisms.

Light rays with low and medium divergence ($\pm\gamma_1$) are collected by refractive member 40 that is operated in a first approximation similar to an aspheric lens, generally with different optical power on a vertical axis and a horizontal axis.

In the preferred embodiment, light rays with high divergence (angles $\pm\gamma_2$) are collected by TIR member 44. An outside surface 52 of TIR member 44 is calculated in such a manner that provides total internal reflection for all rays in angle $\pm\gamma_2$, and reflected rays are directed through output end 48 with a precalculated divergence, not exceeding a maximum angle as given by the specification.

The majority of directional airfield luminaire specifications including a pattern that has a wider divergence in the horizontal plane comparable with divergence in the vertical plane. For example, according to FAA AC No. 150/5345-46B, L-862 type runway edge luminaries require horizontal spread $\alpha=11°$, and vertical spread $\beta=7°$; L-862E type runway threshold/end luminaries require $\alpha=12°$ and $\beta=4.5°$ in red; and taxiway centerline luminaire L-852B types require $\alpha=\pm30°$ and $\beta=3°$ in red.

Figure 3A:
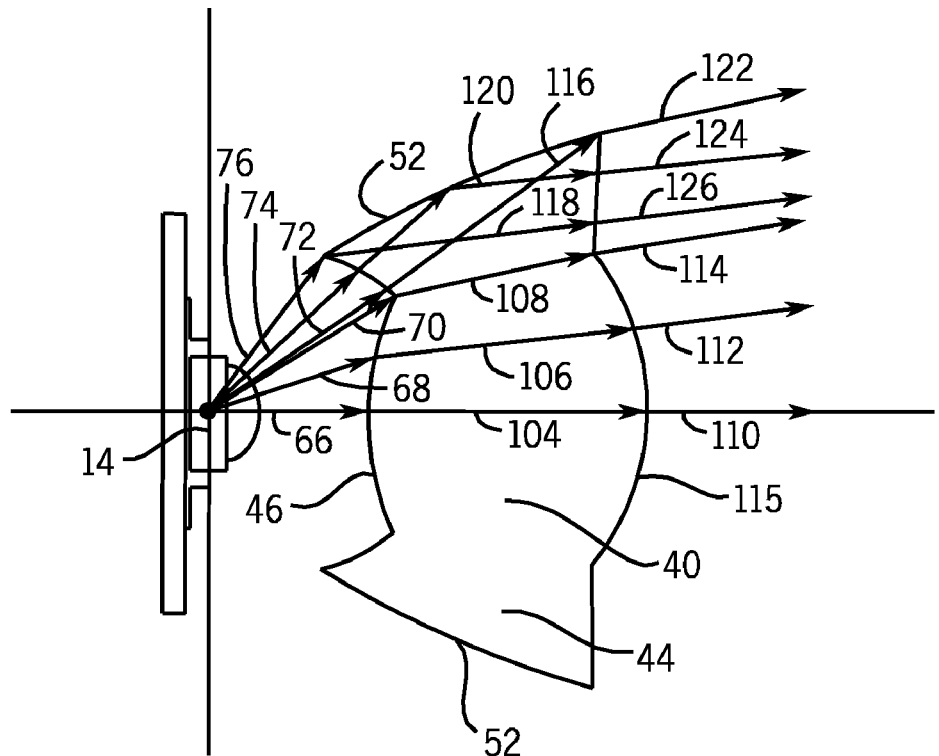
FIG. 3A is cross-sectional view of a LED-non-imaging optic element in a horizontal plane according to the present invention.
Figure 3B:
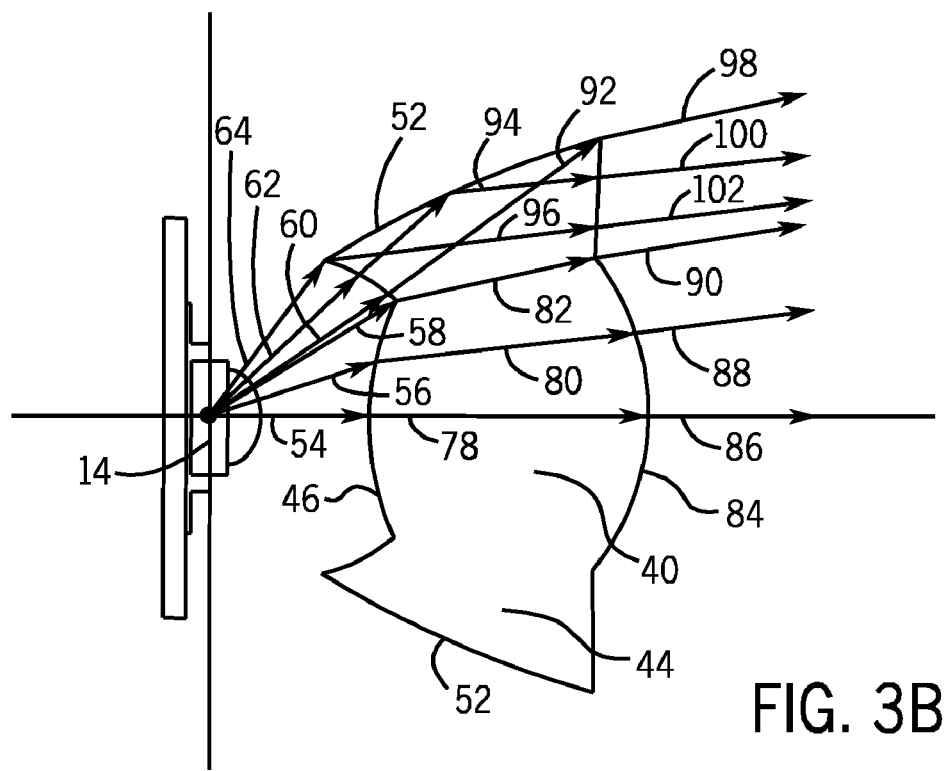
FIG. 3B is a cross-sectional view of a LED-non-imaging optic element in a vertical plane according to the present invention.

FIGS. 3A and 3B illustrate the LED-non-imaging optical element interaction in the horizontal plane (top view) and vertical plane (side view) respectively. LED 14 with an axial-symmetric primary optic emits a symmetrical cone of light rays with a wide but limited angle. Therefore, the divergence of the emitted light is equal in both the horizontal and vertical planes so that a series of rays 54, 56, 58, 60, 62 and 64 (FIG. 3B) in the vertical plane are identical to a series of rays 66, 68, 70, 72, 74 and 76 (FIG. 3A) in the horizontal plane. Accordingly, the calculated profile of input end 46 of non-imaging optical element 16 that collects all of the light emitted from LED 14 is also axis-symmetrical and has no difference in profile.

Incident rays 54, 56 and 58 (FIG. 3B) pass through refractive member 40 as a series of rays 78, 80 and 82. As a result of refraction on a calculated profile 84, rays 78, 80 and 82 are directed outside as a series of rays 86, 88 and 90, respectively, with maximum divergence not exceeding a specified angle β in the vertical plane.

Incident rays 60, 62 and 64 pass through TIR member 44 and are reflected from TIR outside surface 52 as a series of rays 92, 94 and 96, respectively. The profile of TIR outside surface 52 is calculated to provide a maximum divergence of a series of rays 98, 100, 102 not exceeding a specified angle β in the vertical plane. Different methods and software are implemented in the TIR property calculation. The most common procedure involves multiple ray tracing and recurrent calculation based on a point-to-point profiling.

The non-imaging optical element 16 in the horizontal plane (FIG. 3A) is performed in a similar fashion to the vertical plane (FIG. 3B). Rays 66, 68 and 70 are collected by refractive member 40 and pass through as a series of rays 104, 106 and 108, respectively, and are directed through the outside end as a series of rays 110, 112 and 114, respectively. A profile of output end 115 in the horizontal plane is different from profile 84 of the output end in the vertical plane (FIG. 3B) and calculated to provide a maximum divergence angle in the horizontal plane not exceeding a specified angle α.

For example, if angle α in the horizontal plane is bigger than angle β in the vertical plane, the gradient of curvature in general for profile 84 in the vertical plane will be higher than the gradient of curvature for profile 115 in the horizontal plane. Furthermore, both profiles 84 and 115 are dependent on the LED spatial intensity distribution, which is included as a function in the profile calculation.

In the preferred embodiment of the present invention and in a similar manner as described above, incident rays 72, 74 and 76 are reflected from TIR outside surface 52 of TIR member 44 as a series of rays 116, 118 and 120, respectively, and directed outside through the output end as a series of rays 122, 124 and 126, respectively. The profile of TIR outside surface 52 in the horizontal plane (FIG. 3A) is different from TIR outside surface 52 in the vertical plane (FIG. 3B), and is calculated to provide a maximum divergence angle in the horizontal plane not exceeding a specified angle α.

For example, L-862 type runway edge luminaries require α=11°, and β=7° for all colors; L-862E type runway threshold/end luminaries require α=11° and β=9° for green light. Two non-imaging optical elements designed for these two applications will have identical profiles for the output end in the horizontal plane 115 and different profiles for the output end in the vertical plane 84. Similarly, the profiles of TIR outside surface 52 in the horizontal plane (FIG. 3A) will be identical, and the profiles of TIR outside surface 52 in the vertical plane (FIG. 3B) will be different.

Figure 4A:
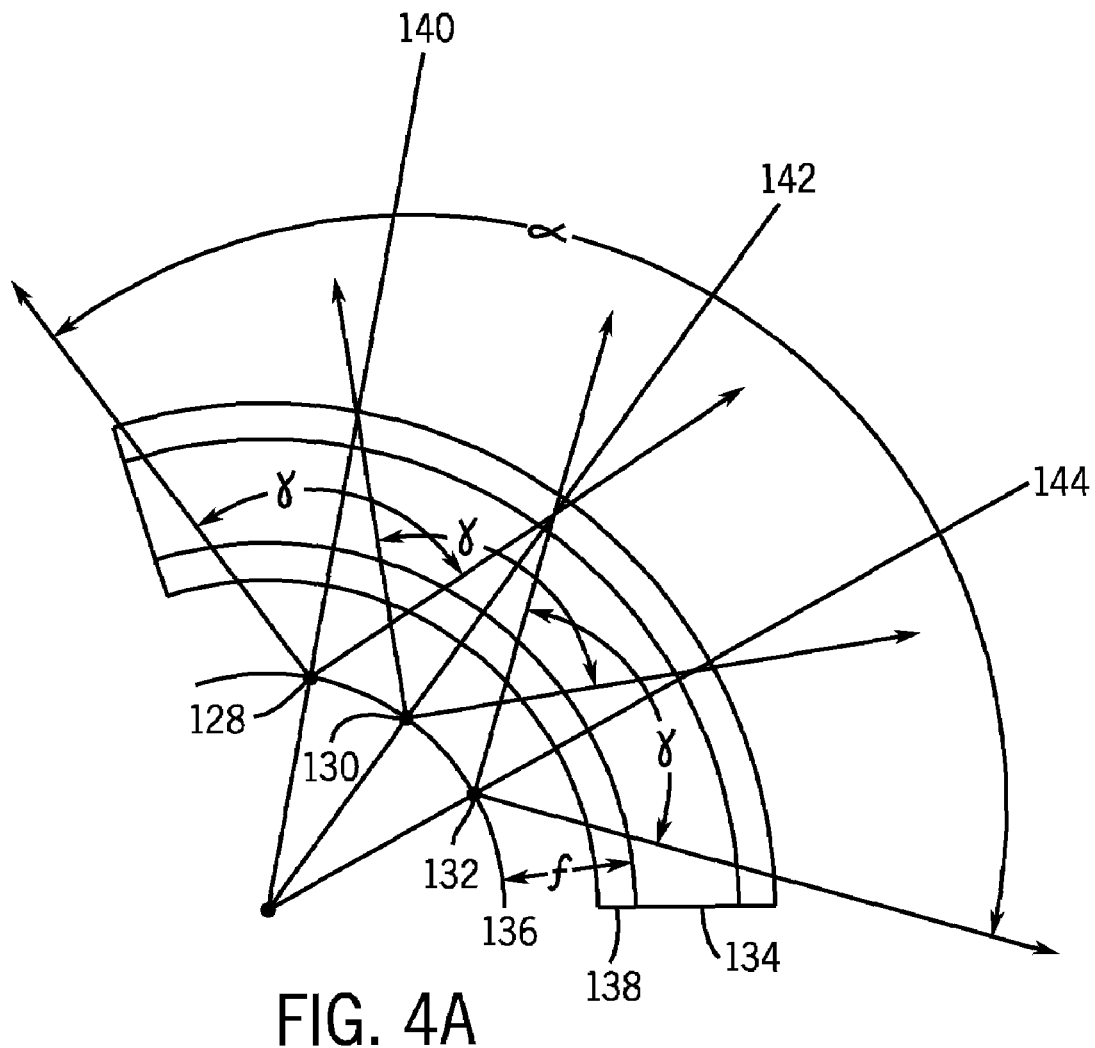
FIG. 4A is a top view of an optical module including multiple LEDs according to the present invention.
Figure 4B:
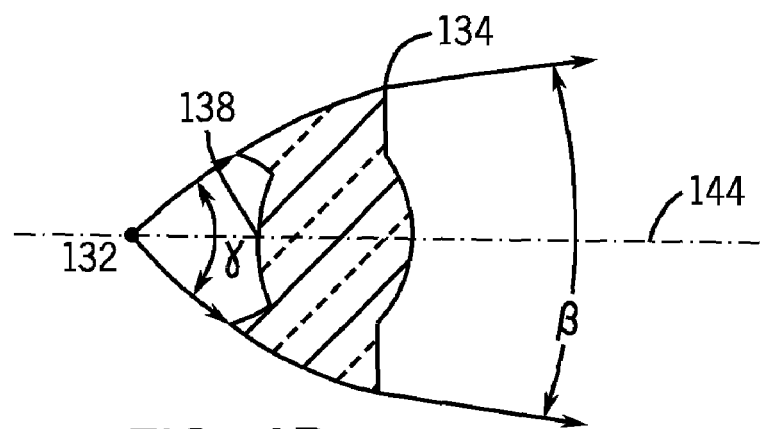
FIG. 4B is a cross-sectional side view of an optical module including multiple LEDs according to the present invention.

Referring now to FIG. 4, an alternative embodiment of the preferred invention includes an optical module design including multiple LEDs 128, 130 and 132, non-imaging optical element 134, and a transparent window (not shown). Non-imaging optical element 134 is shaped in the horizontal plane as a hollow circle sector and remains profiled in the vertical plane as described above.

Multiple LEDs 128, 130 and 132 are located on an arc 136 concentric to the hollow circle. Arc 136 is located at a distance f, equal to the focal length of non-imaging optical element 134 from a refractive element input end 138.

LED axes 140, 142 and 144 are coincident with the hollow circle radii. LEDs 128, 130 and 132 emit light in an axis-symmetrical cone with wide divergence γ. As a result, non-imaging optical element 134 performance as described above includes wide divergence angle γ transformed into a low divergence angle not exceeding specified angle β. There is no impact on the light collected from multiple LEDs 140, 142 and 144 in the horizontal plane (similar to a cylindrical lens) in this embodiment because of the one-dimensional structure of non-imaging optical element 134.

The outgoing pattern in the horizontal plane (β>γ) is subject to variation as a function of the number of LEDs and the angular distance between the LEDs on concentric arc 136.

Figure 5:
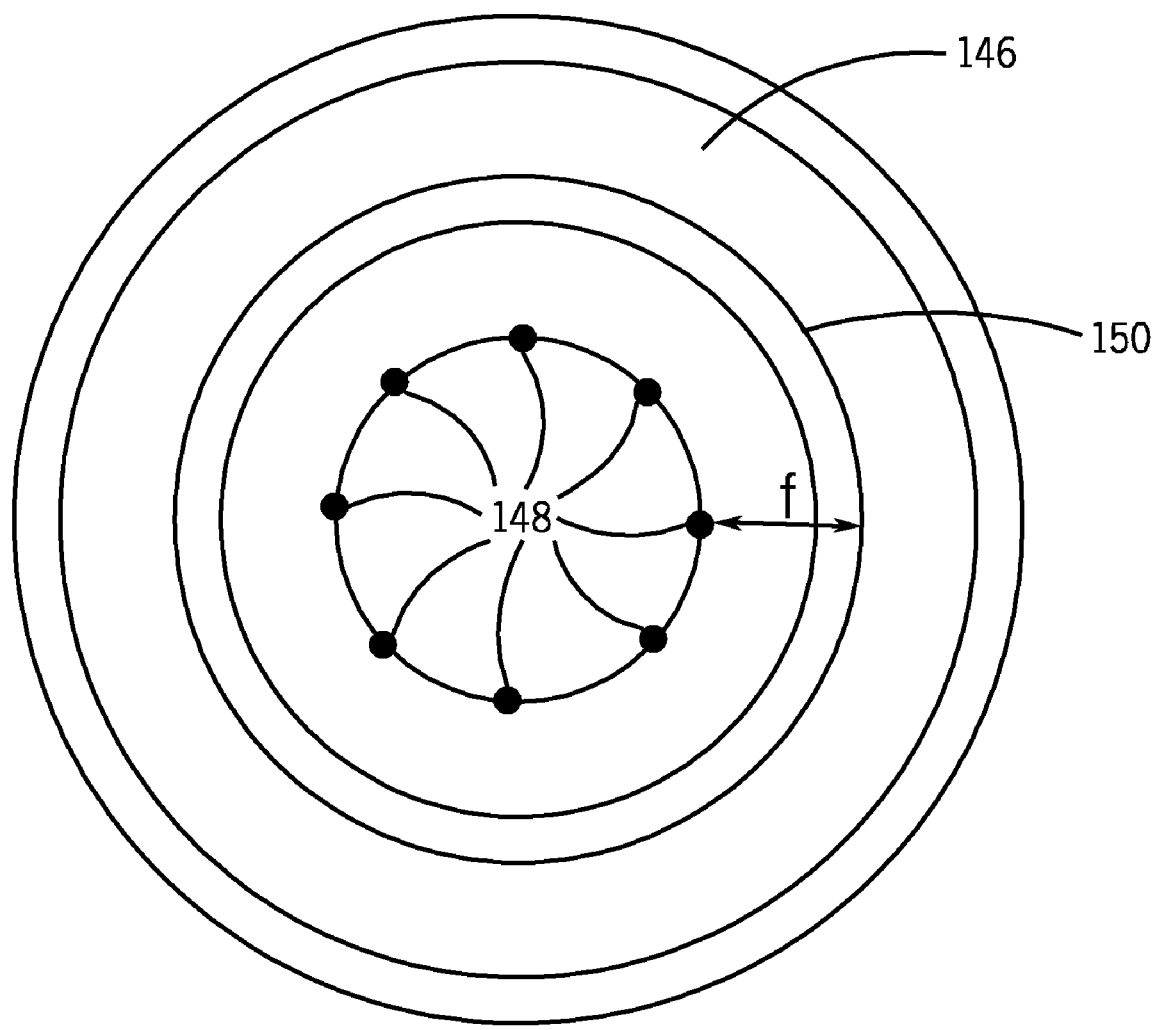
FIG. 5 is a top view of an optical module having an omni-directional pattern in a horizontal plane according to the present invention.

FIG. 5 illustrates a top view of an optical module for another embodiment of the present invention. In order to achieve an omnidirectional pattern in the horizontal plane (α=360°), a non-imaging optical element 146 is shaped as a full hollow circle in the horizontal plane. A series of multiple LEDs 148 are located on the concentric circle inside non-imaging optical element 146 at a distance equal to the focal length f from an input end 150 of refractive member 40.

Figure 6:
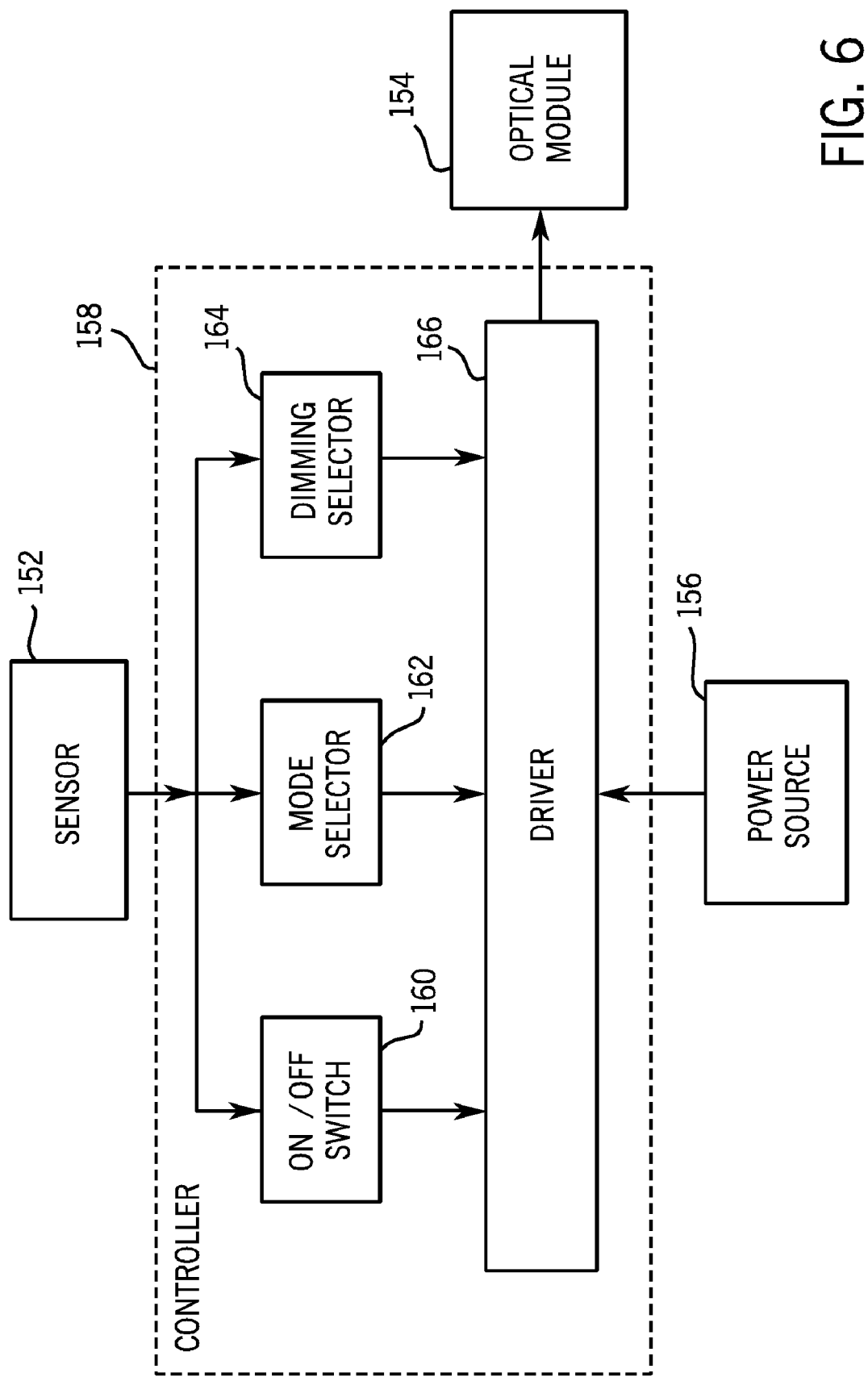
FIG. 6 is a block diagram of a portable airfield luminaire according to the present invention.

As illustrated in FIG. 6, the functional interaction of the portable luminaire subsystems includes a sensor 152, an optical module 154, a power source 156, and a control system 158. In operation, sensor 152 receives signals from a remote control transmitter (not shown) and transmits these signals to a control system 158. Control system 158 includes an on/off switch 160, a steady/flashing mode selector 162, a dimming level selector 164 (e.g., 10%, 30%, 100% of maximum intensity), and a driver 166. According to the desired combination of functions, driver 166 provides optical module 154 (LEDs) with electrical power in the form of adequate DC current.

The scope of the application is not to be limited by the description of the preferred embodiments described above, but is to be limited solely by the scope of the claims that follow. For example, multiple LEDs can be replaced by an array of laser diodes in combination with light shaping elements (e.g., holographic diffusers, etc.) or multiple LEDs can be substituted by plasma light sources with primary optics (e.g., a fusion light). Additionally, a single light source in combination with a fiber optic splitter and an individual light transformer to concentrate and shape outgoing light can also be implemented without departing from the scope of the preferred embodiment of the present invention.

We claim:

1. An optical module including:

at least one light emitting diode (LED) that emits light with a wide divergence; and a non-imaging optical element (NIO) that collects light emitted by the LED with high efficiency, compresses the collected light and directs the compressed light with a precalculated intensity distribution across a pattern, wherein the NIO further includes a first member located around a LED optical axis having a first end that collects light from the LED and a second end opposite the first end to transmit light;

a second member located around the first member, wherein the second member has a first end to collect light and a second end opposite the first end to transmit light, and a wall formed therebetween, wherein an surface of the wall is curved to reflect light through the second end with a precalculated divergence that does not exceed a maximum angle;

wherein the first member and the second member are integrated into a single element having a mutual focal point;

wherein the optical module further comprises a plurality of LEDs;

wherein the NIO element compresses light into a required pattern only in a vertical plane;

wherein the optical module provides a linear pattern in a horizontal plane; and wherein the NIO element is shaped as rectangular bar in a horizontal cross-section and the plurality of LEDs are connected to an inner side of the bar at a distance from the first end of the first member equal to the focal length of the NIO element, and the LED axes located in a horizontal plane perpendicular to the rectangular bar longitudinal axis.

2. The optical module of claim 1, wherein the surface of the reflecting wall is curved as a arbitrary function of LED spatial intensity distribution and precalculated intensity distribution across the pattern.

3. The optical module of claim 2, wherein light reflecting surface satisfies an equation:

$$z = \frac{cy^2}{1 + \sqrt{1 - (1+k)c^2y^2}} + F(y),$$

where z is a coordinate along an axis parallel to the optical axis, y is a coordinate on an axis perpendicular to both the optical axis and an longitudinal axis, k is a constant, c is a curvature, and F(y) is a variable function.

4. The optical module of claim 1, wherein the NIO element comprises of transparent material with index of refraction greater that 1, and light reflecting surface is a total internal reflection (TIR) surface.

5. The optical module of claim 1, wherein the first member of NIO element comprises of transparent material with index of refraction equal or about 1, and light reflecting surface comprises of material with index of refraction greater that 1.

6. The optical module of claim 5, wherein the light reflecting surface comprises of reflective material.

7. A luminaire comprising a plurality of optical modules, each optical module associated with an optical axis and comprising a linearly projected cross-section; and
    for each module, at least one LED positioned such that a central light emitting axis of the at least one LED is angled at about 0° relative to the optical axis associated with this module,
wherein each optical module including
    at least one light emitting diode (LED) that emits light with a wide divergence; and
    a non-imaging optical element (NIO) that collects light emitted by the LED with high efficiency, compresses the collected light and directs the compressed light with a precalculated intensity distribution across a pattern, wherein the NIO further includes
    a first member located around a LED optical axis having a first end that collects light from the LED and a second end opposite the first end to transmit light;
    a second member located around the first member, wherein the second member has a first end to collect light and a second end opposite the first end to transmit light, and a wall formed therebetween, wherein an surface of the wall is curved to reflect light through the second end with a precalculated divergence that does not exceed a maximum angle;
wherein the first member and the second member are integrated into a single element having a mutual focal point;
wherein the optical module further comprises a plurality of LEDs;
wherein the NIO element compresses light into a required pattern only in a vertical plane;
wherein the optical module provides a linear pattern in a horizontal plane; and
wherein the NIO element is shaped as rectangular bar in a horizontal cross-section and the plurality of LEDs are connected to an inner side of the bar at a distance from the first end of the first member equal to the focal length of the NIO element, and the LED axes located in a horizontal plane perpendicular to the rectangular bar longitudinal axis.

* * * * *